United States Patent [19]

Ortolano et al.

[11] Patent Number: 5,248,241
[45] Date of Patent: Sep. 28, 1993

[54] COMPONENTS MADE OF HARDENABLE AND NON-HARDENABLE MATERIALS

[75] Inventors: Ralph J. Ortolano, Rancho Palo Verdes; Kenneth A. Ball, Huntington Beach; Richard E. Serpa, Chino; John P. Pepe, Cypress; Patrick O. Smith, Etiwanda, all of Calif.

[73] Assignee: Southern California Edison Co., Rosemead, Calif.

[21] Appl. No.: 779,922

[22] Filed: Oct. 21, 1991

[51] Int. Cl.$^5$ .................... F01D 5/22; F01D 5/24; F01D 5/28
[52] U.S. Cl. ................. 416/193 R; 416/196 R; 416/224; 416/241 R
[58] Field of Search ............ 416/193 R, 194, 195, 416/196 R, 224, 229 A, 241 R; 428/683, 685, 679

[56] References Cited

U.S. PATENT DOCUMENTS

| | | | |
|---|---|---|---|
| 1,542,402 | 6/1925 | Meissner | 416/196 R |
| 2,714,245 | 8/1955 | Goetzel | 416/241 R |
| 3,561,886 | 2/1971 | Kreischer et al. | 416/224 |
| 3,650,635 | 3/1972 | Wachtell et al. | |
| 4,702,406 | 10/1987 | Sullivan et al. | |
| 4,814,236 | 3/1989 | Qureshi et al. | |
| 4,866,828 | 9/1989 | Fraser | 416/224 |
| 4,953,776 | 9/1990 | Fraser | 416/224 |
| 5,033,938 | 7/1991 | Fraser et al. | |

FOREIGN PATENT DOCUMENTS

| | | | |
|---|---|---|---|
| 1247283 | 10/1960 | France | 416/196 R |
| 1256467 | 2/1961 | France | 416/196 R |
| 45404 | 4/1979 | Japan | 416/241 R |
| 162008 | 12/1979 | Japan | 416/224 |
| 32904 | 2/1983 | Japan | 416/196 R |
| 128403 | 8/1983 | Japan | 416/224 |
| 108804 | 6/1984 | Japan | 416/196 R |

*Primary Examiner*—Edward K. Look
*Assistant Examiner*—James A. Larson
*Attorney, Agent, or Firm*—Sheldon & Mak

[57] ABSTRACT

A component is provided with a relative undersize in an area to be subjected to increased stress, for instance, through temperature. The component is made of a hardenable steel. The undersize is overlaid with a non-hardenable steel thereby to provide the full size. A second layer on top of the first layer can be provided. When the second layer is metallurgically bonded in a manner that generates heat, it does not cause a heat affected zone in the base hardenable steel. Blades for steam turbines benefit from this procedure.

24 Claims, 2 Drawing Sheets

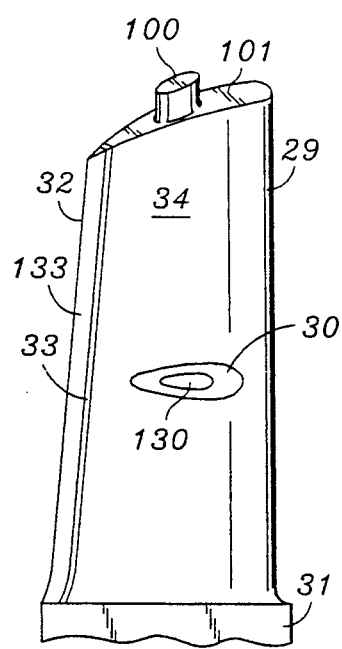
FIG. 2
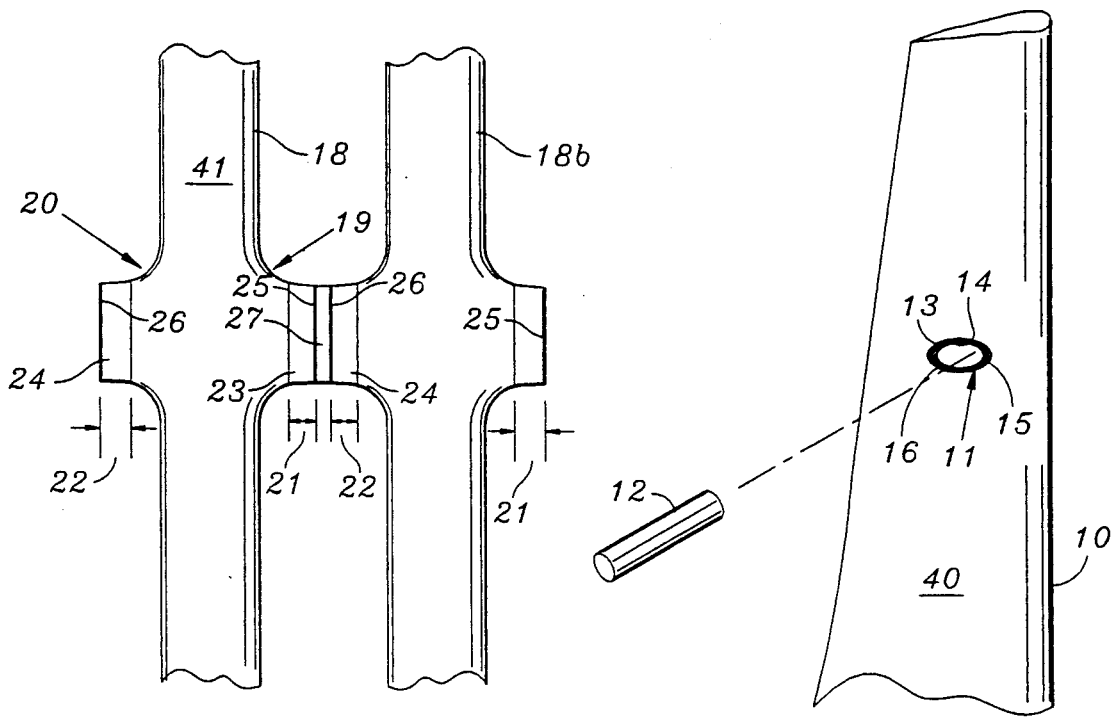
FIG. 1
FIG. 1A
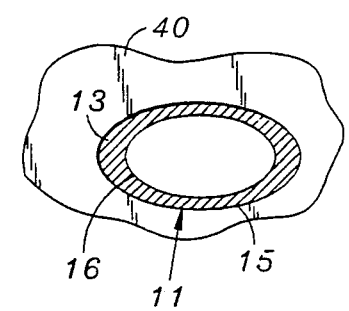
FIG. 3

COMPONENTS MADE OF HARDENABLE AND NON-HARDENABLE MATERIALS

BACKGROUND

Engine components having the ability for longer life under operational conditions is important.

This invention relates to providing components wherein the components operate under high stress conditions. Such components may be for use in engines. In particular, the invention is directed to providing and repairing blades for steam turbines.

In the operational conditions of steam turbines, particular locations in the blades can be subjected to increased stresses caused by high pressure, high temperature, or high corrosion effects, stress concentration, dynamic loading or a combination of them.

The base material of blades is normally of a hardened steel. Portions of the blade which are subjected to increased stress can be provided with components of different characteristics. For instance, a Stellite shield may be provided to a particular portion of the foil vulnerable to particular erosive conditions. Additionally, a wire can be provided to stiffen a blade to reduce bending moments, introduce damping, increase blade frequency and allow for minor tuning adjustments. The wire passes through a wire hole in the blade. Cracking in these holes sometimes is traceable to stress corrosion cracking due to overheating during the brazing process of the wire into the wire hole. Sometimes cracking is the result of pitting and/or corrosion fatigue at the corner of the wire hole.

In other cases, lashing lugs are forged as part of the blade foil which, when assembled on the wheel, are then welded together to form a lashing wire. High hardness in the heat affected zone caused by the welding also provides a location prone to stress corrosion cracking.

Because of the lower stress at the fusion location of the lashing lugs, it has been common practice to use a non-hardenable filler material for the lug welds. Also, it has been common practice that the tie wire material be made of non-hardenable material. Thus, the non-hardenable wire material and non-hardenable filler metals are not stress corrosion sensitive due to the low hardness. However, wherever non-hardenable filler metal is welded to hardenable metal, there will be a heat affected zone in the hardenable material.

A heat affected zone is where the heat of the welding has altered or affected the hardenable material. There is a higher and sometimes a lower than normal hardness at that location, in close proximity. Since a higher hardness produces a higher strength, one would think this condition would be desirable. However, these heat affected zones are subject to the high risk of stress corrosion cracking. As such, these locations in a steam turbine blade are subject to premature failure.

The present invention seeks to overcome this disadvantage.

SUMMARY

The present invention seeks to minimize the likelihood of failure of the blade component normally constituted by hardenable material.

By the invention, there is avoided the creation of a heat affected zone in areas of the blade which are normally constituted by hardenable material.

According to the present invention, there is provided a blade which is formed of a base component of relatively hard metal. The blade is either manufactured undersized or trimmed at the desired location at least in an area of the component intended to be subjected to an increased stress relative to the requisite size in its operational stress environment. There is provided to the base in this area of undersize a metallurgically bonded overlay of relatively non-hardenable material thereby to provide a component of requisite size. The component is then heat stress relieved to remove the high hardness at the heat affected zone.

Thus, when a second overlay material is metallurgically bonded to the first overlay material, there is essentially no metallurgical effect on the nature of the hard base material. Because the metallurgical effect was removed in the first non-hardenable material layer, no additional heat affected zone is created in the hardenable material and/or in the metallurgical bonding of the second layer. The bonding between the first and second overlay materials can be selectively affected by welding or brazing or other selective means.

When heat stress or temperature stress is provided to the first overlay layer, this does not transfer to creating a heat affected zone in the hardenable metal. The heat stress can be affected by the application of the brazing of the second layer to the first layer.

The enhancement of the component serves two purposes:

(a) the non-hardenable metal is not stress corrosion sensitive; and (b) a higher chromium and nickel in the non-hardening filler metal provides essentially a non-corrosion pitting material at a normally high stressed or corrosion concentrating location.

In some preferred forms of the invention, the provision of the first overlay layer to the hardenable base provides the full size component. In other preferred forms, the component is full sized by providing both the first layer and the second layer.

Although the invention is described with reference to a blade for a turbine, it is apparent that the invention has application to other components such as engine components being, for instance, internal combustion engines, gear boxes, compressors, gas turbines, pumps, fans and other forms of turbomachinery, and high strength welded structures.

The invention is directed to the method of constructing the engine component in addition to the engine component.

The invention is now further described with reference to the accompanying drawings.

DRAWINGS

FIG. 1 is a partial isometric view of a turbine blade, the blade having a wire hole, and there being a portion of a wire adjacent the blade.

FIG. 1a is a detail of the blade with the respective overlay.

FIG. 2 is a partial side view of turbine blades having lashing lugs to either side of the blade foil.

FIG. 3 is an isometric view of the blade of FIG. 2 illustrating the lashing lug and a trailing edge portion.

DESCRIPTION

Figure 4:
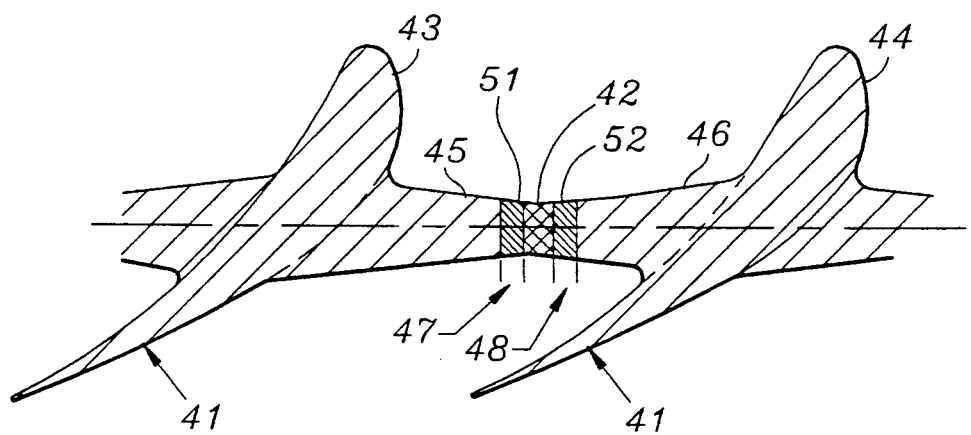
FIG. 4 is a sectional end view of blades illustrating an integral wire with a stub forged integrally to weld blades together.

Constructing an engine component, namely, a blade for a steam turbine which is intended for operation in a stress environment of a steam turbine comprises forming the component 10 of a base of relatively hard metal. This metal is a hardenable steel.

As illustrated in FIGS. 1 and 1a, the base component is constituted by blade 10. Adjacent blades 10 are interconnected through holes 11 and wires 12 which pass through the holes 11. The base blade 10 is undersized in the sense of having a larger hole 11 in the area intended to be subjected to an increased stress. The increased stress is caused by the hole 11, which is a wire hole, receiving the wire 12 in the hole in a manner that the wire 12 is brazed or welded into connection with the blade 10 within the hole 11, the brazing or welding 14 being an effective second layer. The undersizing is filled up by an overlay portion 13 of non-hardenable or ductile material. In this fashion, the component 10 is set up at the requisite size.

The wire 12 is metallurgically heat bonded to the overlay material 13, which is effectively the first overlay between the perimeter lines 15 and 16. The relationship is of a nature that the bonding between wire 12 and material 13 does not affect the metallurgical characteristics of the material of the base component 10.

In the embodiment illustrated in FIG. 2, the foil 18 includes two lashing lugs 19 and 20 to either side. A portion is trimmed off as defined between arrows 21 and 22. In this fashion, therefore, foil 18 is fabricated fully sized and is cut back to form the undersize. In other cases, the foil 18 could be formed without portions 21 and 22, and in this manner it is constructed in the undersized state.

Two rebuilt portions 23 and 24, effectively the first overlay, are respectively provided to complete the lashing lugs 19 and 20, respectively. This creates the full size lashing lugs 19 and 20. The rebuilt portions 23 and 24 are constituted by non-hardenable material.

The ends 25 and 26 of the respective lashing lugs 19 and 20 are welded to each other with a filler welding material 27, effectively the second overlay. The welding affects a heat bonded metallurgical connection with the end 25 and end 26 of an adjacent blade 18b, respectively. The effect of the welding does not impact the base material of the base components of lashing lugs 19 and 20 constituted in the foil 18.

In some cases, the section 23 on the one hand, and section 24 on the other hand, as the two respective layers to the lashing lug, can each jointly constitute the fabricated respective full size for the lashing lug components 19 and 20. The welding material 27 is of a non-hardenable material which may be the same material as sections 23 and 34. Alternatively, the non-hardenable material may be of a different nature.

As illustrated in FIG. 3, there is a foil 29 with a lashing lug 30 and the fastening portion 31. The end face 130 depicts the face to be weld connected with adjacent blades or foils 29 in the manner described with reference to FIG. 2. The blade has a tenon 100 on the blade end 101. The trailing edge 32 of the blade foil 29 is provided with a rebuilt portion 33 which is as an overlay onto which a Stellite (Trademark) shield 133 can be bonded. The bonding of a Stellite (Trademark) shield 133 will not impact the base 34 of the foil 29.

In FIG. 4, a stub 42 connects foils 43 and 44 which has respective lugs 45 and 46. Cut back sections 47 and 48 are illustrated, together with respective layer buildups 51 and 52 and filler weld section 42.

This non-effect on the base 34 of the foil 29 (FIG. 3), or the base 40 of foil 10 (FIG. 1), the base 41 of foil 18 (FIG. 2) and foils 43 and 44 (FIG. 4) is achieved by having the respective bases made of a hardenable steel.

Hardenable steels typically found in steam turbines are (a) steels hardened by heat treatment as a result of an austenite to martensite transformation (i.e., quenched and tempered), and (b) steels hardened by precipitation of a second phase during an aging heat treatment (i.e., precipitation hardened). Both of these steels have the ability to develop high strength and superior toughness.

The microstructure (tempered martensite or bainite) produced by quenched and tempered alloy steel is characterized by a greater toughness or capacity to deform without rupture at any strength level. Plain carbon steel has the ability of developing this favorable microstructure, but only in small sections. The uniqueness of quenched and tempered alloy steel is its ability to attain this microstructure in larger sections.

For these steels to achieve the desirable products of transformation (low temperature martensite and lower bainite), it is essential that the transformation rate of austenite be decreased. In quenched and tempered steels, decreasing the transformation rate of austenite is achieved by alloying elements dissolved in austenite, allowing parts to be cooled more slowly, without transformation of austenite to the undesirable high-temperature products (pearlite or upper bainite). Typical quenched and tempered alloyed steels are:

UNS No. S41000 AISI 410 stainless steel;
UNS No. G41400 AISI 4130; and
UNS No. G43400 AISI 4340.

Precipitation hardening is promoted by one or more alloying elements, such as copper, titanium, columbium, and aluminum. These additions are dissolved during solution annealing or austenite conditioning, and produce normally submicroscopic precipitates during an aging heat treatment that increases the hardness and strength of the matrix.

Precipitation hardening stainless steels are grouped into three types depending on the structure and behavior of the steel when it is cooled from the appropriate solutioning (austenitizing) temperature. These types are martensite, semi-austenitic, and austenitic.

The martensitic types are so named because their composition is balanced to provide a martensitic structure after cooling from the solutioning temperature. Additional strength is obtained by aging.

Semi-austenitic types remain austenitic when cooled from the appropriate annealing temperature. Then, the steel is reheated to condition the structure so that it transforms to martensite on cooling to room temperature. Subsequent aging produces additional strength.

Austenitic precipitation-hardening stainless steels remain austenitic after cooling from the appropriate solutioning temperature. Strengthening is obtained by aging the austenitic structure. Typical precipitation hardened steels are:

UNS No. S17400 17-4 PH stainless steel
UNS No. S15500 15-5 PH stainless steel
UNS No. S45500 Custom 455 stainless steel
UNS No. S17700 17-7 PH stainless steel
UNS No. S35500 AM-355 stainless steel
UNS No. S66286 K66286.

The characteristics of the first overlay material 13 or second overlay material 14 in FIG. 1, or the first overlay materials 23 and 24 of FIG. 2 and the common second overlay material 27 as illustrated on FIG. 2 or of the first overlay material 33 in FIG. 3 is that of a non-hardenable steel.

Non-hardenable steel typically found in steam turbines are steels that can not be hardened by heat treatment (i.e., metallurgically the steel does not experience an allotropic transformation when cooled from elevated temperatures). These non-hardenable steels have excellent high temperature oxidation resistance and elevated temperature properties.

Non-hardenable steels are:
UNS No. S30400 304 stainless steel
UNS No. S30900 309 stainless steel
UNS No. S31000 310 stainless steel
UNS No. S31600 316 stainless steel
UNS No. N06600 Inconel alloy 600.

By providing the structure of non-hardenable material with a broad fill of non-hardenable material, the welding action of the second overlay does not create a heat affected zone in the base materials 40, 41 and 34, respectively. The first overlay 13 and 23 and 24 would be applied prior to assembly of the blades in position. The blades can therefore be suitably stress fatigued by corrosion stress fatiguing such as shot peening and heat stressing which would mean subjecting the component to a heat stress in the range of about 1000° F. to 1300° F. Preferably, this temperature is about 1200° F. A further compression stress by shot peening can be applied to the second overlay portion 14 in FIG. 1, and 25 and 26 in FIG. 2 as necessary.

By effectively trimming out existing components made to size such that the component is undersized and thereupon building in an overlay which can be about ⅛" in thickness, an effective, butter-up or dressing-up is achieved so as to provide a component at full size which has a base of hardenable material onto which is located a non-hardenable material. In other cases, the component can be made undersized of the hardenable material and then the non-hardenable material is added to size the component fully with either the first overlay or the first and second overlay combined.

By avoiding creation of a heat affected zone in the base materials 40, 41 and 34, respectively, there is avoided the likelihood of stress corrosion cracking occurring in the base component.

The application of non-hardening material as a first overlay material to new blades and to prepare existing blades should avoid stress corrosion cracking type problems typical in a stress environment of a steam turbine. The provision of a non-hardening material which is a superior material in a key location of a component eliminates operations required in the field which can cause distortion, overheating of parts and consequent cost and time disadvantages.

After the first overlay material is applied, a thermal stress relief followed by shot peening can be affected to add fatigue strength. Radiographs would verify the integrity of the welds. The blades would then be assembled and lugs welded together using non-hardenable filler material. In this situation, a field preheat is unnecessary because adjacent lugs which are of non-hardenable material are being welded together. The field stress relief is unnecessary since this has already been done in a factory and likewise, field radiograph procedures are unnecessary since this has also been done in a factory. Field shot peening of the field applied filler material and adjacent material can be optionally applied.

Experience has indicated that non-hardenable materials in steam turbines are not subject to pitting. Thus, stress concentrations and corrodent concentrations caused by pits are eliminated with non-hardenable material is used. Thus, the increase of amount of non-hardenable material in the component structure will avoid stress corrosion cracking. Many blade failures previously had been caused by cracks initiated at these corrosion pits.

Although the invention has been described with regard to wire holes and lugs, it equally has application to tenons where non-hardenable material can be used as the first overlay for rebuilding, or new tenons can be made of non-hardenable material. Since the non-hardenable material is used in a tenon, pitting will be avoided and thus the likelihood of the tenon hole becoming a "crud trap" becomes reduced especially if the non-hardened tenon material is compression stressed, for instance by shot peening.

Although the invention has been described and illustrated with regard to blades and portions of blades, it has been made clear that other applications of the invention procedure exist. These include where:

(a) smaller hardenable components are welded together to form larger structures which then become difficult, inconvenient or expensive to stress relieve;

(b) pitting corrosion causes a reduction in component life; and (c) assembly processes introduce the risk of stress corrosion cracking due to hardening.

Many other examples of the invention exist, each differing from the other in matters of detail only. The invention is to be considered in terms of the scope of the following claims.

We claim:

1. A blade for a turbine comprising a base component of hardenable metal, the component being undersized at least in an area expected to experience high stress and degradation due to at least one of corrosion fatigue or stress corrosion cracking relative to a requisite size in its operational environment, and a bonded overlay of non-hardenable material provided in the area of undersize thereby to provide a component of requisite size.

2. A blade as claimed in claim 1 wherein the base component includes a heat affected zone adjacent to the bonded overlay being stress relieved and including a metallurgically bonded second overlay material on the non-hardenable material, the second overlay material having been heat bonded to the first overlay material such as to avoid affecting the essential metallurgical nature of the hardenable metal.

3. A blade as claimed in claim 2 wherein there is no heat affected zone in the hardenable metal when the heat bonding of the second overlay material is applied to the first overlay material.

4. A blade as claimed in claim 3 wherein the first overlay material is metallurgically bonded to the base metal.

5. A blade as claimed in claim 4 wherein the base metal is selectively a hardened steel, the hardening being affected by precipitation hardening and wherein the non-hardenable material is selectively a steel metallurgically non-responsive to allotropic transformation when cooled from an elevated temperature.

6. A blade as claimed in claim 4 wherein the base metal is selectively a strengthened steel, the strengthening being affected by heat treatment and wherein the non-hardenable material is selectively a steel metallurgically non-responsive to allotropic transformation when cooled from an elevated temperature.

7. A blade as claimed in claim 2 wherein the area of high stress is an area adjacent to a hole through the blade.

8. A blade as claimed in claim 2 wherein the area of high stress is an area adjacent to a hole in the blade.

9. A component for a turbine comprising a base component of hardenable metal, the component being undersized at least in an area expected to experience high stress and degradation due to at least one of corrosion fatigue or stress corrosion cracking relative to a requisite size in its operational environment, a bonded overlay of non-hardenable material provided in the area of undersize thereby to provide a component of requisite size.

10. A blade as claimed in claim 9 wherein the base component includes a heat affected zone adjacent to the bonded overlay being stress relieved including a metallurgically bonded second overlay material on the non-hardenable material, the second overlay material having been heat bonded to the first overlay material such as to avoid affecting the essential metallurgical nature of the hardenable metal.

11. A blade as claimed in claim 10 wherein there is no heat affected zone in the hardenable metal when the heat bonding of the second overlay material is applied to the first overlay material.

12. A component as claimed in claim 11 wherein the first overlay material is metallurgically bonded to the base metal.

13. A component as claimed in claim 12 wherein the base metal is selectively a hardened steel, the hardening being affected by precipitation hardening and wherein the non-hardenable material is selectively a steel metallurgically non-responsive to allotropic transformation when cooled from an elevated temperature.

14. A component as claimed in claim 12 wherein the base metal is selectively a hardened steel, the hardening being affected by heat treatment and wherein the non-hardenable material is selectively a steel metallurgically non-responsive to allotropic transformation when cooled from an elevated temperature.

15. A component as claimed in claim 10 wherein the area of high stress is a lashing lug for a blade.

16. A component as claimed in claim 10 wherein the area of high stress is an area adjacent to a hole through a blade.

17. A component for a turbine comprising a base component of hardenable material, the component having a tie wire hole, an area adjacent to the hole being expected to experience degradation due to at least one of corrosion fatigue or stress corrosion cracking size in its operational environment, and a bonded overlay of non-hardenable material provided in the area of degradation.

18. A blade as claimed in claim 17 wherein the base component includes a heat affected zone, the heat affected zone including the bonded overlay and being stress relieved and including a metallurgically bonded second overlay material on the non-hardenable material, the second overlay material having been heat bonded to the first overlay material such as to avoid affecting the essential metallurgical nature of the hardenable material.

19. A blade as claimed in claim 18 wherein there is no heat affected zone in the hardenable material when the heat bonding of the second overlay material is applied to the first overlay material.

20. A blade as claimed in claim 19 wherein the first overlay material is metallurgically bonded to a base metal.

21. A component for a turbine comprising a base component of hardenable material, the component having a lashing lug, being undersized at least in the lashing lug, such lug being expected to experience degradation due to at least one of corrosion fatigue or stress corrosion cracking relative to a requisite size in its operational environment, and a bonded overlay of non-hardenable material provided in the area of undersize thereby to provide a component of requisite size.

22. A blade as claimed in claim 21 wherein the base component includes a heat affected zone adjacent to the bonded overlay being stress relieved and including a metallurgically bonded second overlay material on the non-hardenable material, the second overlay material having been heat bonded to the first overlay material such as to avoid affecting the essential metallurgical nature of the hardenable material.

23. A blade as claimed in claim 22 wherein there is no heat affected zone in the hardenable material when the heat bonding of the second overlay material is applied to the first overlay material.

24. A blade as claimed in claim 23 wherein the first overlay material is metallurgically bonded to a base metal.

* * * * *